US010798631B2

(12) United States Patent
Agarwal et al.

(10) Patent No.: US 10,798,631 B2
(45) Date of Patent: Oct. 6, 2020

(54) ENHANCED X2 PROTOCOL

(71) Applicant: Parallel Wireless, Inc., Nashua, NH (US)

(72) Inventors: Kaitki Agarwal, Westford, MA (US); Yang Cao, Westford, MA (US); Jitender Arora, Nashua, NH (US); Michael Yasuhiro Saji, Brookline, MA (US); Zeev Lubenski, North Andover, MA (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 15/207,494

(22) Filed: Jul. 11, 2016

(65) Prior Publication Data

US 2017/0013513 A1  Jan. 12, 2017

Related U.S. Application Data

(60) Provisional application No. 62/191,029, filed on Jul. 10, 2015.

(51) Int. Cl.
*H04W 36/22* (2009.01)
*H04W 84/04* (2009.01)
(Continued)

(52) U.S. Cl.
CPC ........... *H04W 36/22* (2013.01); *H04W 24/02* (2013.01); *H04W 84/045* (2013.01);
(Continued)

(58) Field of Classification Search
CPC ........... H04L 61/2015; H04L 61/2514; H04W 28/08; H04W 36/00; H04W 36/02;
(Continued)

(56) References Cited

U.S. PATENT DOCUMENTS 7,184,418 B1 * 2/2007 Baba ................. H04L 29/06027
370/331
7,804,826 B1 * 9/2010 Khalil ................ H04L 63/0272
370/389
(Continued)

FOREIGN PATENT DOCUMENTS

CN 106134251 A * 11/2016 ........ H04W 36/0066
EP 1654625 B1 5/2006
(Continued)

OTHER PUBLICATIONS

Third Generation Partnership Project, "3GPP TS 24.312 v13.3.0, 3rd Generation Partnership Project; Technical Specification Group Core Network and Terminals; Access Network Discovery and Selection Function (ANDSF) Management Object (MO) (Release 13)," Jun. 2016.

(Continued)

*Primary Examiner* — Eric Nowlin
(74) *Attorney, Agent, or Firm* — Michael Y. Saji; David W. Rouille

(57) ABSTRACT

A system for an enhanced X2 interface in a mobile operator core network is disclosed, comprising: a Long Term Evolution (LTE) core network packet data network gateway (PGW); an evolved NodeB (eNodeB) connected to the LTE PGW; a Wi-Fi access point (AP) connected to the LTE PGW via a wireless local area network (WLAN) gateway; and a coordinating node positioned as a gateway between the LTE PGW and the eNodeB, and positioned as a gateway between the LTE PGW and the Wi-Fi AP, the coordinating node further comprising: a network address translation (NAT) module; and a protocol module for communicating to the eNodeB and the Wi-Fi AP to request inter-radio technology (inter-RAT) handovers of a user equipment (UE) from the
(Continued)

eNodeB to the Wi-Fi AP and to forward packets intended for the UE from the eNodeB to the Wi-Fi AP.

21 Claims, 6 Drawing Sheets

(51) Int. Cl.
*H04W 24/02* (2009.01)
*H04W 88/16* (2009.01)
*H04W 84/12* (2009.01)
*H04W 36/02* (2009.01)
*H04W 28/08* (2009.01)
*H04W 92/20* (2009.01)
*H04W 92/02* (2009.01)
*H04L 29/12* (2006.01)

(52) U.S. Cl.
CPC ...... *H04L 61/2015* (2013.01); *H04L 61/2514* (2013.01); *H04W 28/08* (2013.01); *H04W 36/02* (2013.01); *H04W 84/12* (2013.01); *H04W 88/16* (2013.01); *H04W 92/02* (2013.01); *H04W 92/20* (2013.01)

(58) Field of Classification Search
CPC ..... H04W 36/14; H04W 36/22; H04W 48/18; H04W 84/12; H04W 88/06; H04W 88/16; H04W 92/02; H04W 92/20
See application file for complete search history.

(56) References Cited

U.S. PATENT DOCUMENTS

| | | | | |
|---|---|---|---|---|
| 9,510,256 | B2 * | 11/2016 | Krishna | H04W 36/22 |
| 9,729,456 | B2 * | 8/2017 | Lv | H04W 4/18 |
| 9,742,535 | B2 * | 8/2017 | Lorca Hernando | H04J 11/00 |
| 10,568,005 | B2 * | 2/2020 | Das | H04W 36/0083 |
| 2003/0048791 | A1 | 3/2003 | De Cnodder et al. | |
| 2008/0075003 | A1 | 3/2008 | Lee et al. | |
| 2010/0005178 | A1 | 1/2010 | Sindelaru et al. | |
| 2013/0072146 | A1 | 3/2013 | Smith | |
| 2014/0064156 | A1 | 3/2014 | Paladugu et al. | |
| 2014/0213256 | A1 | 7/2014 | Meylan et al. | |
| 2014/0226482 | A1 * | 8/2014 | Lv | H04W 28/08 |
| | | | | 370/235 |
| 2014/0233386 | A1 | 8/2014 | Jamadagni et al. | |
| 2014/0308959 | A1 | 10/2014 | De Benedittis et al. | |
| 2014/0341109 | A1 | 11/2014 | Cartmell et al. | |
| 2014/0355536 | A1 | 12/2014 | Muley et al. | |
| 2015/0103755 | A1 | 4/2015 | Cui et al. | |
| 2015/0172959 | A1 | 6/2015 | Cucala Garcia et al. | |
| 2015/0180629 | A1 * | 6/2015 | Lorca Hernando | H04J 11/00 |
| | | | | 370/330 |
| 2015/0215774 | A1 | 7/2015 | Huang et al. | |
| 2015/0296390 | A1 * | 10/2015 | Mino Diaz | H04L 5/003 |
| | | | | 455/450 |
| 2016/0007247 | A1 * | 1/2016 | Lee | H04W 36/0066 |
| | | | | 370/331 |
| 2016/0037432 | A1 | 2/2016 | Lin et al. | |
| 2016/0081082 | A1 | 3/2016 | Cao et al. | |
| 2016/0088470 | A1 | 3/2016 | Sivavakeesar | |
| 2016/0105919 | A1 | 4/2016 | Kawaguchi et al. | |
| 2016/0119941 | A1 | 4/2016 | Ko et al. | |
| 2016/0165499 | A1 | 6/2016 | Xu et al. | |
| 2016/0205060 | A1 | 7/2016 | Gunnarsson et al. | |
| 2016/0227449 | A1 | 8/2016 | Sivavakeesar et al. | |
| 2016/0255677 | A1 | 9/2016 | Masini et al. | |
| 2016/0277992 | A1 | 9/2016 | Cao | |
| 2017/0070923 | A1 * | 3/2017 | Li | H04W 36/0066 |
| 2017/0156086 | A1 * | 6/2017 | Tomici | H04W 36/14 |
| 2017/0230877 | A1 * | 8/2017 | Claassen | H04W 36/0016 |
| 2017/0251412 | A1 | 8/2017 | Xu et al. | |
| 2017/0273134 | A1 * | 9/2017 | Cao | H04W 76/30 |
| 2019/0297540 | A1 * | 9/2019 | Das | H04W 76/10 |
| 2019/0364616 | A1 * | 11/2019 | Mishra | H04W 88/16 |

FOREIGN PATENT DOCUMENTS

| | | | | |
|---|---|---|---|---|
| EP | 2816846 A1 * | 12/2014 | | H04W 48/16 |
| EP | 2887760 A1 * | 6/2015 | | H04J 11/00 |
| EP | 3108689 A1 * | 12/2016 | | H04W 36/0066 |
| EP | 3544371 A1 * | 9/2019 | | H04W 76/27 |
| KR | 20160125435 A * | 10/2016 | | H04W 36/0066 |
| WO | 2013043869 A1 | 3/2013 | | |
| WO | 2013153128 A2 | 10/2013 | | |
| WO | 2014069954 A1 | 5/2014 | | |
| WO | 2014207253 A1 | 12/2014 | | |
| WO | 2015018490 A1 | 2/2015 | | |
| WO | WO-2015127241 A1 * | 8/2015 | | H04W 36/0066 |
| WO | 2016083524 A1 | 6/2016 | | |

OTHER PUBLICATIONS

Third Generation Partnership Project, "3GPP TS 36.420 v13.0.0, 3rd Generation Partnership Project; Technical Specification Group Radio Access Network; Evolved Universal Terrestrial Radio Access Network (E-UTRAN); X2 General Aspects and Principles (Release 13)," Dec. 2015.
Third Generation Partnership Project, "3GPP TS 36.421 v13.0.0, 3rd Generation Partnership Project; Technical Specification Group Radio Access Network; Evolved Universal Terrestrial Radio Access Network (E-UTRAN); X2 Layer 1 (Release 13)," Dec. 2015.
Third Generation Partnership Project, "3GPP TS 36.423 v13.3.0, 3rd Generation Partnership Project; Technical Specification Group Radio Access Network; Evolved Universal Terrestrial Radio Access Network (E-UTRAN); X2 Application Protocol (X2AP) (Release 13)," Mar. 2016.
"Access Network Discovery and Selection Function," Wikipedia, the free encyclopedia, May 6, 2016 Version, https://en.wikipedia.org/w/index.php?title=Access_network_discovery_and_selection_function&oldid=718895419.
"How Interworking Works: A Detailed Look at 802.11u and Hotspot 2.0 Mechanisms," Ruckus Wireless, Inc., Jul. 2013, retrieved from http://a030f85c1e25003d7609-b98377aee968aad08453374eb1df3398.r40.cf2.rackcdn.com/wp/wp-how-interworking-works.pdf.
Magdalena Nohrborg, "Self-Organizing Networks," Third Generation Partnership Project, retrieved from http://www.3gpp.org/technologies/keywords-acronyms/105-son.
"Integration of Cellular and Wi-Fi Networks," 4G Americas, Sep. 2013, retrieved from http://www.4gamericas.org/files/3114/0622/2546/Integration_of_Cellular_and_WiFi_Networks_White_Paper-_9.25.13.pdf.
Third Generation Partnership Project, "3GPP TS 24.302 v12.9.0, 3rd Generation Partnership Project; Technical Specification Group Core Network and Terminals; Access to the 3GPP Evolved Packet Core (EPC) via non-3GPP access networks; Stage 3 (Release 12)," Jun. 2015.
Third Generation Partnership Project, "3GPP TS 23.402 v13.2.0, 3rd Generation Partnership Project; Technical Specification Group Services and System Aspects; Architecture enhancements for non-3GPP accesses (Release 13)," Jun. 2015.
PCT International Search Report for PCT/US16/41824.
"Restructuring of X2 GW Proxy Section", 3GPP TSG-RAN Meeting #80, Change Request, 37.803 CR 0006, Version 11.1, May 20-24, 2013, Fukuoka, Japan.

* cited by examiner

HO from Wi-Fi to LTE

HO from Wi-Fi to LTE, in congestion case (traffic steering)

ENHANCED X2 PROTOCOL

CROSS-REFERENCE TO RELATED APPLICATIONS

This application claims the benefit of priority under 35 U.S.C. § 119(e) or PCT Article 8 of U.S. Provisional Patent Application No. 62/191,029, filed on Jul. 10, 2015, which is hereby incorporated by reference herein in its entirety for all purposes. Additionally, U.S. patent application Ser. No. 14/642,544 (U.S. Pat. App. Pub. No. US20150257051) and U.S. Pat. App. Pub. Nos. US20140086120, US20140092765, US20140133456, US20140233412, US20150045063, US20150078167, US20150173111, and US20160135132 are hereby incorporated by reference in their entirety for all purposes.

BACKGROUND

The X2 interface and X2 application protocol (referred to herein as the X2 protocol or X2AP) are a defined interface and protocol for providing point-to-point communications between two eNodeBs within a Long Term Evolution (LTE) radio access network. The X2 interface supports the exchange of signaling information and also supports the forwarding of packets from one eNodeB to another eNodeB via a tunnel. The X2 interface is defined and specified in various 3GPP technical specifications, such as 3GPP TS 36.420, hereby incorporated by reference. The X2 interface is used by the X2 application protocol, which supports many applications, including mobility management (e.g., handovers); load management; reporting of general error situations; resetting X2; setting up X2; and eNB configuration updates. The X2 application protocol is defined and specified in 3GPP TS 36.423, hereby incorporated by reference.

Handovers of a mobile device from one eNodeB to another eNodeB are one of the most important uses of the X2AP. Enabling eNodeBs to perform self-organizing network (SON) functions is also an important use of the X2AP. However, X2AP, being limited to eNB-eNB messaging, has limited usefulness for enabling any of these important uses in a heterogeneous network with communications between 3GPP and non-3GPP network nodes. A need exists for coordination between Wi-Fi and 3GPP networks similar to the coordination that is already possible between 3GPP nodes using the X2 protocol.

The following 3GPP technical specifications are hereby incorporated by reference: TS 36.423; TS 36.420; TS 36.421; TS 23.402; TS 24.302; and TS 24.312, dated as of the priority date of this application.

SUMMARY

Systems and methods for an enhanced X2 interface in a mobile operator core network are described, providing interoperability and functional enhancements to both 3rd Generation Partnership Project (3GPP) and Wi-Fi networks. This interface, identified herein as an X2+ interface, is intended to enable enhanced operator control for wireless local area network (WLAN) interworking, and enable WLAN to be included in the operator's cellular Radio Resource Management (RRM). In order to do so, it may allow sharing of information such as radio link quality per user equipment (UE), backhaul quality, load, and other information between the WLAN and 3GPP networks.

In a first embodiment, a system for an enhanced X2 interface in a mobile operator core network is disclosed, comprising: a Long Term Evolution (LTE) core network packet data network gateway (PGW); an evolved NodeB (eNodeB) connected to the LTE PGW; a Wi-Fi access point (AP) connected to the LTE PGW via a wireless local area network (WLAN) gateway; and a coordinating node positioned as a gateway between the LTE PGW and the eNodeB, and positioned as a gateway between the LTE PGW and the Wi-Fi AP, the coordinating node further comprising: a network address translation (NAT) module; and a protocol module for communicating to the eNodeB and the Wi-Fi AP to request inter-radio technology (inter-RAT) handovers of a user equipment (UE) from the eNodeB to the Wi-Fi AP and to forward packets intended for the UE from the eNodeB to the Wi-Fi AP.

DETAILED DESCRIPTION

Figure 1:
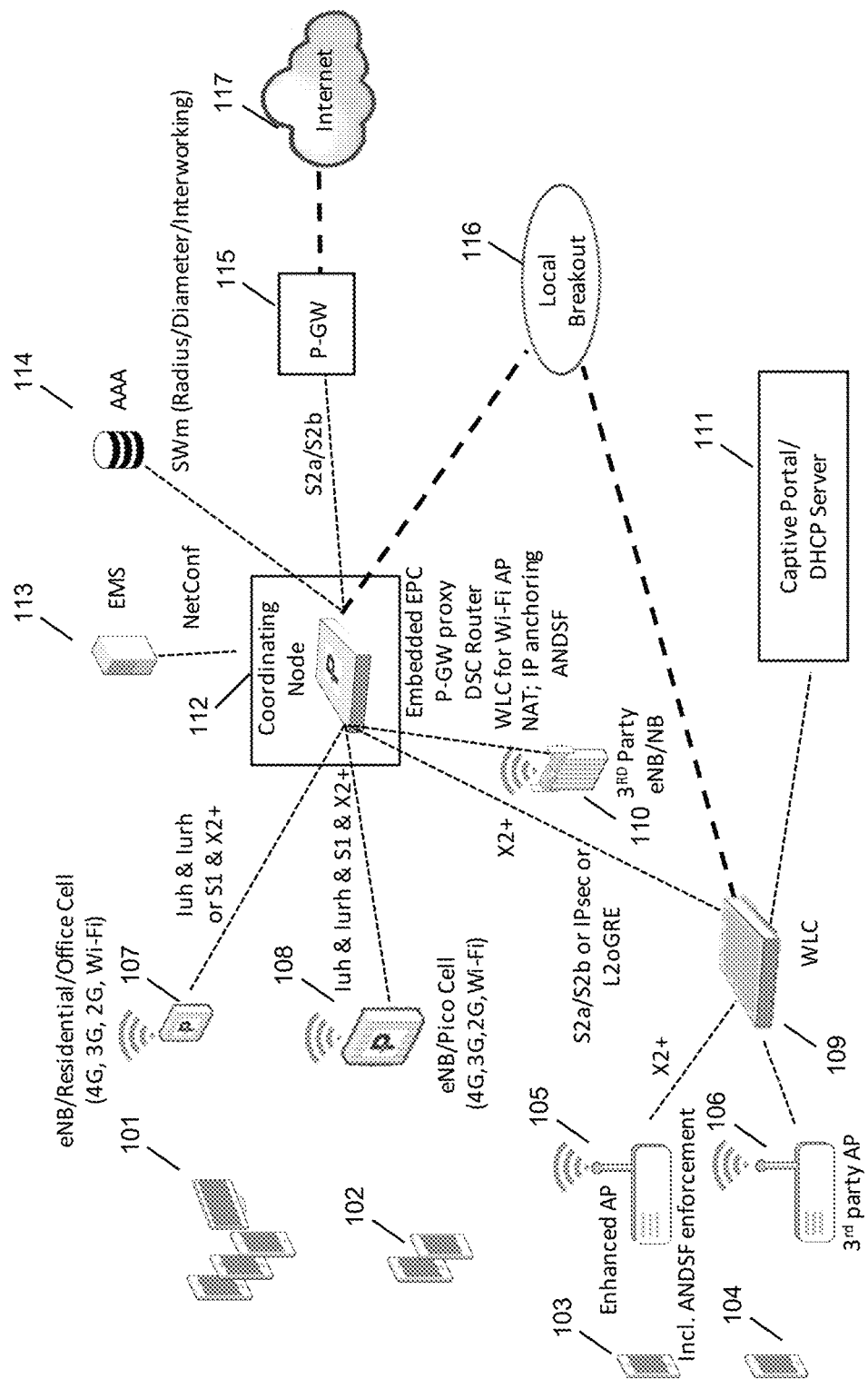
FIG. 1 is a schematic network diagram for a system implementing services over an enhanced X2 protocol, in accordance with some embodiments.

As described above, a need exists for coordination between Wi-Fi and 3GPP networks similar to the coordination that is already possible between 3GPP nodes using the X2 protocol. One approach is to attempt to integrate heterogeneous radio access networks as peers within the network. This requires duplicating infrastructure. For example, a network operator today typically has both a 3G and a 4G LTE core active at the same time. But enabling interoperability and coordination is difficult and depends on the specifics of the underlying technologies. Additional examples of this approach are the trusted wireless access gateway (TWAG) and evolved packet data gateway (ePDG), which integrate non-3GPP access networks by connecting them to the EPC core, but with the same interoperability and coordination challenges. Handover and SON coordination between a 3GPP RAN and a non-3GPP RAN is difficult and complex.

Another approach to performing coordination is to add a new network function to the operator core network as a dedicated network node. An example of this approach is the addition of the access network discovery and selection function (ANDSF) to the evolved packet core (EPC), as specified by 3GPP TS 24.312, hereby incorporated by reference. However, the new network function has the disadvantage that it may not seamlessly interoperate with existing functions. If existing functions are not aware of the new function, they will not be able to interoperate. Further, updating existing functions will require a significant investment in upgrading each component of the core network and testing whether the upgraded nodes are interoperable.

This disclosure focuses on the use of a coordinating node in the core network, deployed together with an enhanced multi-RAT base station/access point. The coordinating node is placed in the network between the RAN and the rest of the core network, and operates as a gateway, or in some cases as a proxy. This network location for the coordinating node allows the coordinating node to hide the details of an underlying RAN from the core network. By hiding the underlying RAN and presenting standard interfaces to the core network, the coordinating node is able to provide a virtualized RAN that reduces interoperability concerns, while enabling heterogeneity at the RAN layer, and even enabling inter-RAT handovers without interworking towards the core network. The coordinating node is also able to provide coordination and SON functions for the RANs that are part of its virtualized RAN, for keeping the RAN nodes working smoothly, such as power control among neighbors, traffic admission control, and load balancing, and these SON functions operate smoothly across RATs as well as within individual RATs.

Such a system is advantageous as it enables a tight feedback loop across both 3GPP and non-3GPP networks. This type of coordination is important especially with the advent of LTE-Unlicensed (LTE-U) and LTE-Assisted Access (LAA) technologies, which operate in the traditional Wi-Fi frequency bands, and with expected increased use of Wi-Fi both for providing access to mobile devices and also for wireless backhaul applications. Coordination of network management functions across LTE and Wi-Fi is thus highly desirable.

One way to accomplish these goals is to enhance the X2 interface and X2AP protocol, in some embodiments, to enable the coordination and handover functions contemplated by the 3GPP X2 specifications in this new network infrastructure. For example, while the X2 interface is defined to be between two 3GPP eNodeBs, an extended X2+ interface would be able to be used between an eNodeB and a Wi-FI access point (AP), or between an eNodeB and a coordinating node, or between an AP and a coordinating node, or between two APs. Certain features of the LTE eNodeB are not available on a standard Wi-Fi AP.

SON operations and information may be shared among modules at the coordinating node. In some embodiments, SON methods and operations may be provided as understood in the 3GPP specifications, or as described in U.S. Pat. App. Pub. Nos. US20140092765 (PWS-71700US02) and US20160135132 (PWS-71775US01). Specific SON operations enabled by the disclosure herein include power level adjustment, centralized assignment of power levels, load balancing, traffic steering, and assigning attachment ordering policies to networks to reduce congestion. The SON operations may be initiated by the coordinating node. The SON operations may require information from the base stations and/or APs, and the coordinating node may send X2+ messages to obtain the information from the base stations and/or APs. The coordinating node may also use information obtained via other means, such as information stored at the coordinating node, to make SON decisions, and may send SON action requests to the base stations and/or APs using X2+ messages.

The inventors have contemplated and understood that a coordinating node located as a gateway in a core network can manage both 3GPP eNodeBs and Wi-Fi access points. In the standard 3GPP architecture, management functions such as handover and inter-eNB load balancing are enabled via the X2AP protocol. A new X2+ protocol is proposed to manage both 3GPP nodes and Wi-Fi access points from the coordinating node/gateway, with the coordinating node acting as a master node or server, in some embodiments.

In some embodiments, the coordinating node may act as a wireless LAN controller (WLC), to manage a set of WLAN APs, and may additionally coordinate communications between the WLAN APs and the 3GPP network. In some embodiments, the coordinating node may coordinate with existing standards-based WLCs to provide X2+ protocol capabilities to the WLANs managed by the WLC.

In some embodiments, the X2+ interface may provide one or more of the following features.

a. It may provide improved bi-directional load balancing between WLAN and 3GPP radio access networks in order to provide improved system capacity.

b. It may improve performance (WLAN interworking should not result in decreased performance, but rather, it is preferable that performance be improved for better user experience).

c. It may improve the utilization of WLAN when it is available and not congested.

d. It may reduce or maintain battery consumption (e.g. due to WLAN scanning/discovery).

e. It may be compatible with all existing core network WLAN related functionality, e.g. seamless and non-seamless offload, trusted and non-trusted access, multi-access packet data network connectivity (MAPCON) and IP flow mobility and seamless offload (IFOM).

f. It may be backward compatible with existing 3GPP and WLAN specifications, i.e. work with legacy UE's even though legacy UE's may not benefit from the improvements provided by these solutions.

g. It may rely on existing WLAN functionality.

h. It may allow per target WLAN system distinction (e.g. based on service set identifier or SSID).

i. It may allow Per-UE control for traffic steering.

j. It may ensure that access selection decisions does not lead to ping-ponging between universal terrestrial radio access network (UTRAN)/evolved UTRAN (E-UTRAN) and WLAN.

Architecture

A network architecture may be employed as shown in the below figure. The figure shows various types of radio access technology being coordinated at a multi-RAT coordinating node, such as the Parallel Wireless HetNet Gateway™. The coordinating node may contain, in some embodiments, modules providing functionality for an embedded EPC, a packet gateway (P-GW) proxy, and a DSC router. The protocol being used to communicate with each node is shown as a label on the edge between the two nodes.

In some embodiments, the nodes marked "pico cell" may be a macro cell, a small cell, or a femto cell, an enterprise cell, or some combination thereof. In some embodiments, a number of cells and/or wireless network APs may be coordinated, up to a practical processing limit of the coordinating node. EMS is element management system. WLC is wireless LAN controller. AP is access point.

In some embodiments, each AP may communicate with the coordinating node directly or via a WLC. The WLC may communicate directly to the coordinating node via the X2+ protocol defined herein, or another protocol as appropriate. Packet traffic may be routed via a local breakout node from the WLC to the coordinating node, in some embodiments. Circuit-switched traffic is received at a cellular base station (shown as Pico Cell in the figure above) and transported via the Iuh protocol to the core network via the coordinating node. Ampersands and slashes in the above figure are understood to indicate that one or more of the listed interfaces may be supported as needed. In some embodiments, the access cells and APs shown in the figure may be individually connected to each other by the X2+ interface.

Delivery of the X2+ protocol message may be provided over stream control transmission protocol (SCTP), as defined by the 3GPP X2 protocol, in case that a multi-RAT AP supports SCTP. However, X2+ may also be delivered over TCP, UDP, a GTP-U tunnel, an IPsec tunnel, IPv4, IPv6, or via any other IP protocol. X2+ protocol messages may be formatted similarly to X2 protocol messages. As X2 is an extensible protocol, any additional information elements (IEs) may be added to the X2+ protocol message as needed.

A coordinating node may be in a gateway position between a radio access network (RAN) and an LTE core network. The coordinating node may provide proxying functionality and may appear as a single base station (virtualized base station) to the core network, as described elsewhere herein and in the patent applications incorporated herein by reference. The coordinating node may act as a trusted wireless access gateway (TWAG) or evolved packet data network gateway (ePDG) as well, or may communicate with other TWAGs and ePDGs, to enable Wi-Fi access networks to securely connect to and use services of the LTE core network. The coordinating node may use an S2/S2a interface with the core for the TWAG and ePDG. The coordinating node may use an S1 interface with the core for its attached real and virtual eNodeBs.

The coordinating node may act as a proxy and routing point for X2+ protocol communications, and may initiate X2+ communications to one or more eNodeBs in the RAN, or even non-eNBs such as wireless APs having special X2+ capabilities, to provide functions as described herein.

The coordinating node may act as a proxy and anchor point for an attached UE. For example, instead of enabling a UE to anchor at a packet gateway (PGW) in the core network as is typically the case in an LTE network, a UE may attach at the coordinating node. Any IP address allocated by the core network PGW is used by the coordinating node to perform network address translation (NAT). The coordinating node may receive the IP and may assign it directly to the UE, or may assign another IP. When the UE receives communications from the core, NAT at the coordinating node may be used to forward these communications to the UE.

Anchoring at the coordinating node is helpful when the UE is moved from a 3GPP access network (eNodeB) to a Wi-Fi access network. The coordinating node may detect that a handover is being performed, and may provide a DHCP function to the Wi-Fi RAN, and may assign the same IP address already being used to the UE, and may perform NAT and otherwise manage packet flows to and from the UE so that packet flows going to and from the UE are delivered, even across radio access technologies.

In some embodiments, the X2+ protocol may be implemented between a mobile operator side node, such as a coordinating node or eNB or multi-RAT eNB, and a wireless AP side node, such as a wireless AP or WLC. Implementation at coordinating node and WLC enables self-optimizing network (SON) applications as described above. Implementation at eNB and AP enables handover functionality as described above, and analogous to capabilities enabled by X2 protocol between eNodeBs. Certain subsets of X2+ functionality may be implemented at each of these nodes to enable the functionality described herein. For example, HO-centric functionality may be enabled at the eNB and AP but not the SON-centric functionality. If handover functionality is implemented at a WLC, the captive portal or dynamic host configuration protocol (DHCP) protocol features used to assign IPs and anchor UEs, and the network address translation (NAT) features used to enable handover without IP address change may also be implemented at the WLC. In some embodiments, a TWAG and a ePDG module may be embedded as software modules inside the coordinating node.

An analog of the ANDSF network node may be used, in some embodiments, to allow a non-3GPP access network, such as a Wi-Fi AP, to provide certain features that are typically provided using X2 in a 3GPP network. Traditional ANDSF is implemented between a UE and a LTE core network, and the ANDSF network node provides information, such as an inter-system mobility policy (ISMP) and inter-system routing policy (ISRP), and discovery information (a list of networks that may be available), directly to a UE over the S14 reference point. In this disclosure, however, a subset of ANDSF may be implemented between the coordinating node and a non-3GPP AP. This subset of ANDSF may be used to inform the AP of nearby LTE nodes, to update connection policies at an AP (e.g., using ISMP), and to coordinate handovers into and out of the AP's network. In the case that a UE has an implementation of ANDSF, an ANDSF management object may be forwarded to the UE and the UE may be directed to select either a Wi-Fi or an LTE network using ISMP. However, in the case that a non-ANDSF-capable UE is on the Wi-Fi AP, the Wi-Fi AP may implement a subset of ANDSF, and may be configured to apply an ISMP directly to one or more UEs on its network. This is considered herein to be the enforcement aspect of the ANDSF functionality.

For example, in some embodiments, an AP may obtain an ANDSF policy over X2+ from a coordinating node. The coordinating node may indicate, via an ISMP policy, that the Wi-Fi network should take priority over an LTE network in the area. The AP may then attempt to solicit UEs to join its network to prevent those UEs from joining the LTE network, for example, by aggressively advertising beacons, increasing its power level if possible, autoselecting a channel that will maximize its signal to noise ratio, and by advertising connectivity to the LTE network over ANDSF. If the AP is a multi-RAT node and is on the same device as the eNodeB whose LTE RAN is identified in the policy, the eNodeB may also configure itself to refuse connections from new UEs. This may result in multi-RAT UEs attaching to the AP instead of to the LTE network. ANDSF management functions may be used to suggest to a UE what SSIDs to connect to. Different policies may be enabled based on time of day, congestion level, and/or other factors as described elsewhere herein and in the referenced patent applications incorporated herein.

In some embodiments, the X2+ protocol may be implemented between a mobile operator side node, such as a coordinating node or eNB or multi-RAT eNB, and a wireless AP side node, such as a wireless AP or WLC. Implementation at coordinating node and WLC enables self-optimizing network (SON) applications as described above. Implementation at eNB and AP enables handover functionality as described above, and analogous to capabilities enabled by X2 protocol between eNodeBs. Certain subsets of X2+ functionality may be implemented at each of these nodes to enable the functionality described herein. For example, HO-centric functionality may be enabled at the eNB and AP but not the SON-centric functionality. If handover functionality is implemented at a WLC, the captive portal or dynamic host configuration protocol (DHCP) protocol features used to assign IPs and anchor UEs, and the network address translation (NAT) features used to enable handover without IP address change may also be implemented at the WLC. In some embodiments, a TWAG and a ePDG module may be embedded as software modules inside the coordinating node.

Authentication may be performed between the coordinating node and either the AP, WLC, or eNodeB. Authentication may be performed during IPsec tunnel establishment between the nodes and the coordinating node, thereby providing secure key-based authentication as well as encryption of communications, to prevent hijacking of configuration messages sent over the X2+ protocol connection.

The coordinating node may include various modules as follows. A listener module may listen for incoming X2+ messages. Since the X2+ protocol and regular X2 messages are in many respects the same, differing for some messages only in the type of endpoint supported and the method of transport, a single listener module may be used for both X2 and X2+, in some embodiments. A description of a coordinating node for handling X2 messages may be found in US20150257051 (PWS-71756US01), hereby incorporated by reference, and the same coordinating node may be used to handle X2+ messages to and from the network nodes described herein for the purposes described herein.

In some embodiments admission control may be provided. Admission control may involve policy enforcement performed at the coordinating node, and may involve X2+ messages exchanged between the eNodeB/AP and the coordinating node to determine whether a given UE should be handed over or should have its admission rejected. The coordinating node may communicate with a policy charging rules function (PCRF) or authorization, authentication and accounting (AAA) server to obtain information for making a determination about a particular UE, and may send the determination to the eNB/AP via the X2+ message.

In some embodiments, policies for enforcement, including admission control policies, may be enforced not by the coordinating node but at the eNodeB or AP directly. An enhanced AP may be configured with an access network discovery and selection function (ANDSF) module. The ANDSF module may provide all or a subset of functionality of a typical ANDSF module, and may be used to send an inter-system mobility policy (ISMP) to a UE that supports ANDSF.

In some embodiments, a custom administration module may use a proprietary protocol over the X2+ interface to perform a variety of administrative and configuration functions, including: SSID changes; frequency and modulation changes; power level changes; security and authentication changes; routing and filtering changes; and other configuration changes.

FIG. 1 is a schematic network diagram for a system implementing services over an enhanced X2 protocol, in accordance with some embodiments. Mobile devices 101 are attached to multi-RAT eNodeB 107, mobile devices 102 are attached to enodeB 108, mobile device 103 is attached to enhanced AP 105, and mobile device 104 is attached to standards-compliant third-party AP 106. Wireless LAN controller 109 is controlling APs 105 and 106, and is capable of providing hierarchical X2+ to enhanced AP 105, as well as serving as a TWAG/ePDG for both APs 105 and 106. Third-party eNodeB 110 is also provided. Coordinating node 112 is the gateway for all the radio access network nodes 107, 108, 105, 106, 110. In some cases, the coordinating node handles the X2+ protocol between the RAN nodes and itself for performing handover and SON functions, including handovers and SON functions across 3GPP/non-3GPP networks. Captive portal/DHCP server 111 is provided for providing IP addresses to WLC 109 and APs 105/106; in some embodiments these functions may be provided by coordinating node 112 as well. Coordinating node manages connections to element management system 113, AAA server 114, and the LTE core network, a subset of which is shown by PGW 115. PGW 115 provides access to Internet 117. In some cases local breakout server 116 provides network access to WLC 109 to enable it to access coordinating node 112; this may be over the public Internet in cases that the APs 105, 106 are in the home and are connected via residential broadband.

In operation coordinating node 112 performs multiple functions, including: an embedded evolved packet core (EPC) functionality for proxying and hiding EPC functions from the core; a PGW proxy and NAT functions for hiding IP address changes and for enabling IP anchoring of UEs at the coordinating node; a DSC router, and ANDSF functionality. ANDSF enforcement functionality may be provided by enhanced AP 105, with policies being determined and sent from coordinating node 112.

Actions to be supported

Two general categories of actions may be thought to be supported by the X2+ interface: handovers; and self-optimizing network functionality (SON).

Important scenarios that are supported include: keeping circuit-switched calls on 2G/3G and moving packet-switched sessions onto WLAN; and keeping VoLTE on LTE and moving data channel to WLAN.

For handovers, many of the existing wireless concepts from the X2 protocol apply. For example, handover should be supported from one node (e.g., an access node such as an eNB or Wi-Fi AP) to another node, regardless of whether the node is on a 3GPP network or on a Wi-Fi network. 3GPP TS 36.423, the X2 protocol specification, should be consulted as a reference for the below, and is hereby incorporated in its entirety.

In some embodiments, handovers may be initiated using this protocol. Information about the mobile device being handed over, packet flows, open connections/bearers, and other information may be passed along to the target node from the source node, optionally transiting through the coordinating node.

In some embodiments, authentication may also be facilitated by this protocol. Ciphers first used for authentication at a prior node will be passed along to the subsequent node during handover. If a node has already authenticated, the authentication data may be cached and may be available, and authentication will not be repeated, saving the round trip to the core network authentication, authorization and accounting (AAA) server.

For self optimizing network functionality, a variety of desirable scenarios may be supported, for both Wi-Fi and 3GPP access nodes, including the following:

Preventing mobile devices from admission to a particular node. If a node is congested, the X2+protocol may be used to request load information, which may be used by the network to prevent mobile devices form being admitted to that node. If the node is not congested but is otherwise an undesirable node, for example, if link quality is poor, the X2+ protocol may also be used. This may be thought of as a load balancing function. The X2+ protocol may be used to initiate the state of preventing mobile devices from admission, and to terminate such a state, at the access node. Proprietary messages may be used, or ANDSF policies may be used for Wi-Fi. In the case of eNodeBs, attach requests may be intercepted by the coordinating node before an attach completes, and the coordinating nodes may prevent the UE from completing the attach.

Reporting on handover statistics may be performed. The X2+ protocol may be used to request handover statistics such as number of call drops or handover drops, historical drops, thresholds active at time of drop, thresholds at current time, etc. This information may be used to facilitate preventing mobile devices from admission or for load balancing. Mobility robustness operations (MRO) may be facilitated. The information may be aggregated at the coordinating node and used across radio access technologies and networks. Notably, as a single SON module is present on the coordinating node, and the SON module for the coordinating node integrates the information it receives, SON may be able to more accurately diagnose problems, identify outages, handle recurring UE traffic patterns, etc. and coverage, transmission power, modulation schemes, and other configurations may be changed by the coordinating node by sending X2+ messages to eNodeBs and/or Wi-Fi APs.

Interference mitigation operations may be detected, facilitated or initiated. Information about two or more access nodes may be sent to a central coordinator, which may determine that interference is being caused by one of the access nodes and may then request that the interfering node reduce its transmit power. This may be performed for interference by a 3GPP node to a Wi-Fi node or vice versa, or between 3GPP nodes, or between Wi-Fi nodes.

Outage compensation may be detected, facilitated or initiated. If handovers are detected to be failing in a particular area, or if only certain areas are known to be covered, or if a previously-active access node is found to be inactivated, a central coordinator may request that other access nodes increase transmit power or that an inactive node be activated to cover the area.

Greenfield usage shutdown may be facilitated or initiated. If a particular coverage area is not needed, for example, in a rural area during the middle of the night, shutdown of that area may be initiated by sending X2+ messages to those nodes.

While LTE performs direct management of handovers and directly controls whether or not a UE may attach to a given eNB, UE attachment to a Wi-Fi AP is less controlled. ANDSF may be used between a UE and an ANDSF node in the core network to cause a UE to attach to a particular SSID, but this requires UE support. However, it is desirable to enable handover between Wi-Fi and 3GPP and vice versa, even when ANDSF is not supported by the UE. Certain methods are described hereinbelow enabled by the X2+ protocol and by coordination using the coordinating node, for load balancing and handover between 3GPP and non-3GPP nodes. Specifically, the following scenarios are contemplated: (1) a 3GPP to Wi-Fi handover due to mobility, (2) a Wi-Fi to 3GPP handover due to mobility, and (3) a traffic steering congestion based handover are considered.

1. UE on LTE, Moving into Wi-Fi Coverage Zone

Figure 2:
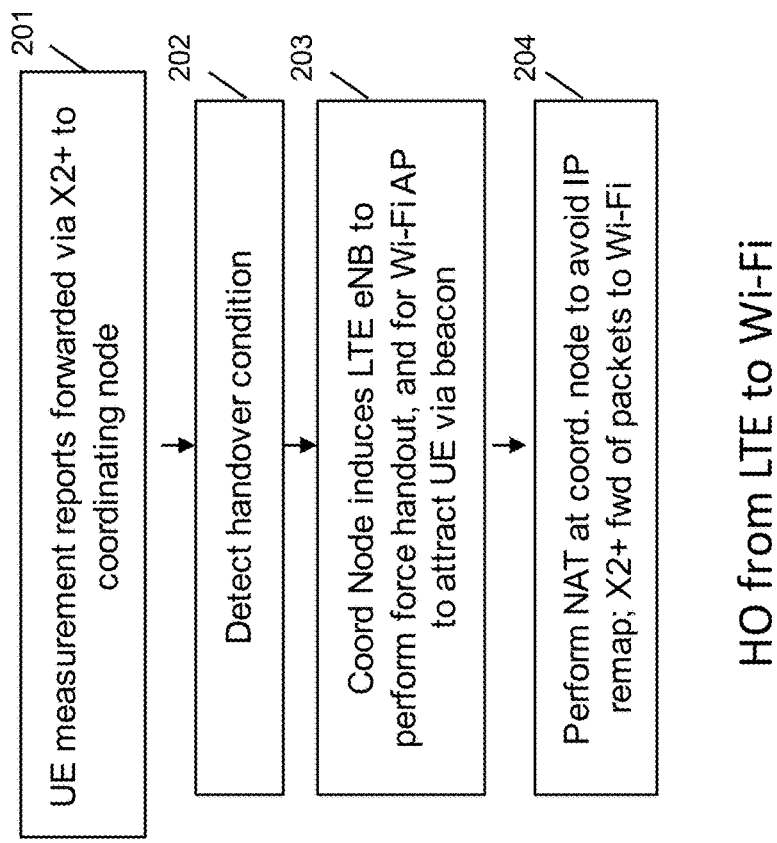
FIG. 2 is a flowchart depicting a handover from a 3GPP node to a non-3GPP node, in accordance with some embodiments.

FIG. 2 is a flowchart depicting a handover from a 3GPP node to a non-3GPP node, in accordance with some embodiments. This scenario occurs when a UE enters into a Wi-Fi coverage zone while exiting an LTE coverage zone. In some embodiments, at step 201, UE measurement reports will be forwarded by the eNodeB to the coordinating node, either via X2+ or via another protocol. As well, the Wi-Fi AP may forward information regarding a newly-attaching UE to the coordinating node via X2+. The coordinating node may detect, based on signal strength measurements received from the UE or the eNodeB or the AP or any of the above, or location information about the UE, or triangulating the location of the UE, or reported neighbors of the UE, that the UE is performing a handover. The coordinating node may begin to buffer packets that may later be sent to the UE at the target AP via X2+. At step 202, the coordinating node may identify that the same UE is attached to both nodes. The coordinating node may then make a decision to cause a handover from LTE to Wi-Fi for the UE. The decision may be made based on an internal threshold at the coordinating node, or on a threshold at the UE, the threshold being based on a measure of signal strength such as RSSI, or on distance or location, or on another factor.

At step 203, the coordinating node causes the LTE eNodeB to force handout of the UE. However, the coordinating node does not request to the core network that the UE's bearer be destroyed, thus avoiding "break before make." The coordinating node then assigns an IP address via DHCP, either via an internal DHCP server or by sending X2+ messages to the Wi-Fi AP. The new IP may or may not be the same as the old IP. The Wi-Fi AP then assigns the new IP address to the UE, and the UE begins using the Wi-Fi access point. The coordinating node may also forward to the UE, via the Wi-Fi AP, any IP traffic that was already received and buffered for the UE at the eNodeB, or at the coordinating node itself, over the LTE network, similar to the way that packets are forwarded from source to target eNodeB during an LTE X2 handover. At step 204, additional traffic to the UE is mapped via NAT at the coordinating node to the Wi-Fi network.

2. UE on Wi-Fi, Moving into LTE Coverage Zone

Figure 3:
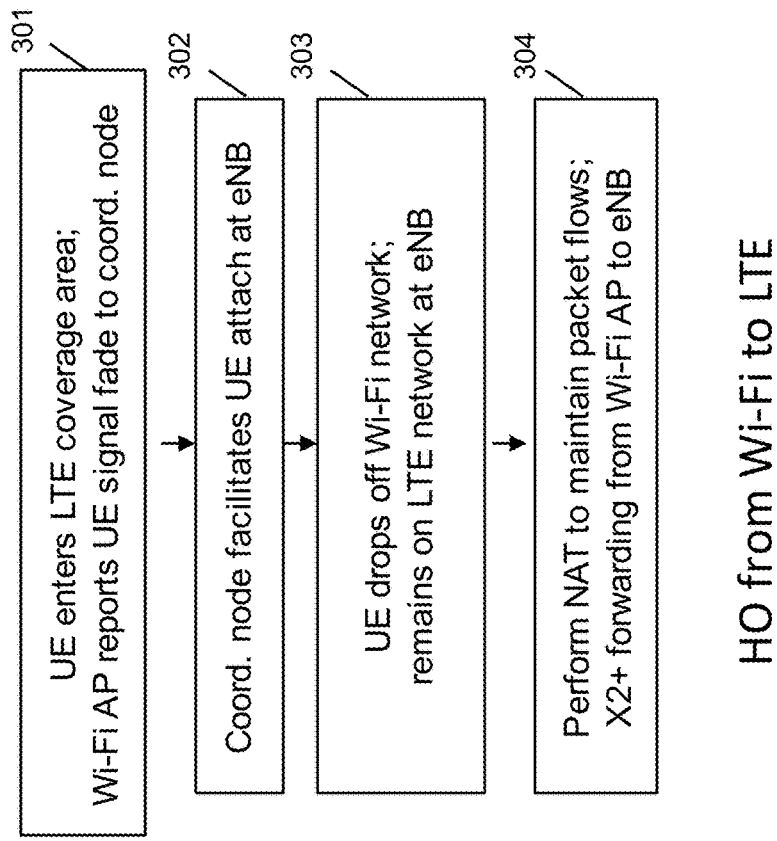
FIG. 3 is a flowchart depicting a handover from a non-3GPP node to a 3GPP node, in accordance with some embodiments.

FIG. 3 is a flowchart depicting a handover from a non-3GPP node to a 3GPP node, in accordance with some embodiments. This scenario occurs when a UE is in motion and enters an LTE coverage zone while exiting an Wi-Fi coverage zone. In some embodiments, at step 301, the UE may enter the LTE coverage zone and request to attach to the eNodeB, while maintaining a connection to the Wi-Fi AP but with fading signal. Both the eNodeB and the Wi-Fi AP may report this information to the coordinating node via the X2+ protocol. The coordinating node may detect, based on signal strength measurements received from the UE or the eNodeB or the AP or any of the above, or location information about the UE, or triangulating the location of the UE, or reported neighbors of the UE, that the UE is performing a handover. The coordinating node may begin to buffer packets for the UE to be delivered to the target eNodeB. At step 302, the UE is connected to the LTE PGW via the coordinating node and is assigned an IP address. The IP may be used at the coordinating node for network address translation, to maintain any IP flows currently active over the Wi-Fi AP connection. At step 303, once the UE physically exits the vicinity of the Wi-Fi AP, it may leave the Wi-Fi network. At step 304, the coordinating node may use NAT to maintain packet flows to the UE on the new LTE RAN, and may use X2+ from the Wi-Fi AP to the eNodeB via the coordinating node to forward packets from the source AP to the target eNodeB. The UE and PGW may be shielded from any IP address change using NAT.

3. Traffic Steering/Admission Control Based on Congestion

Figure 4:
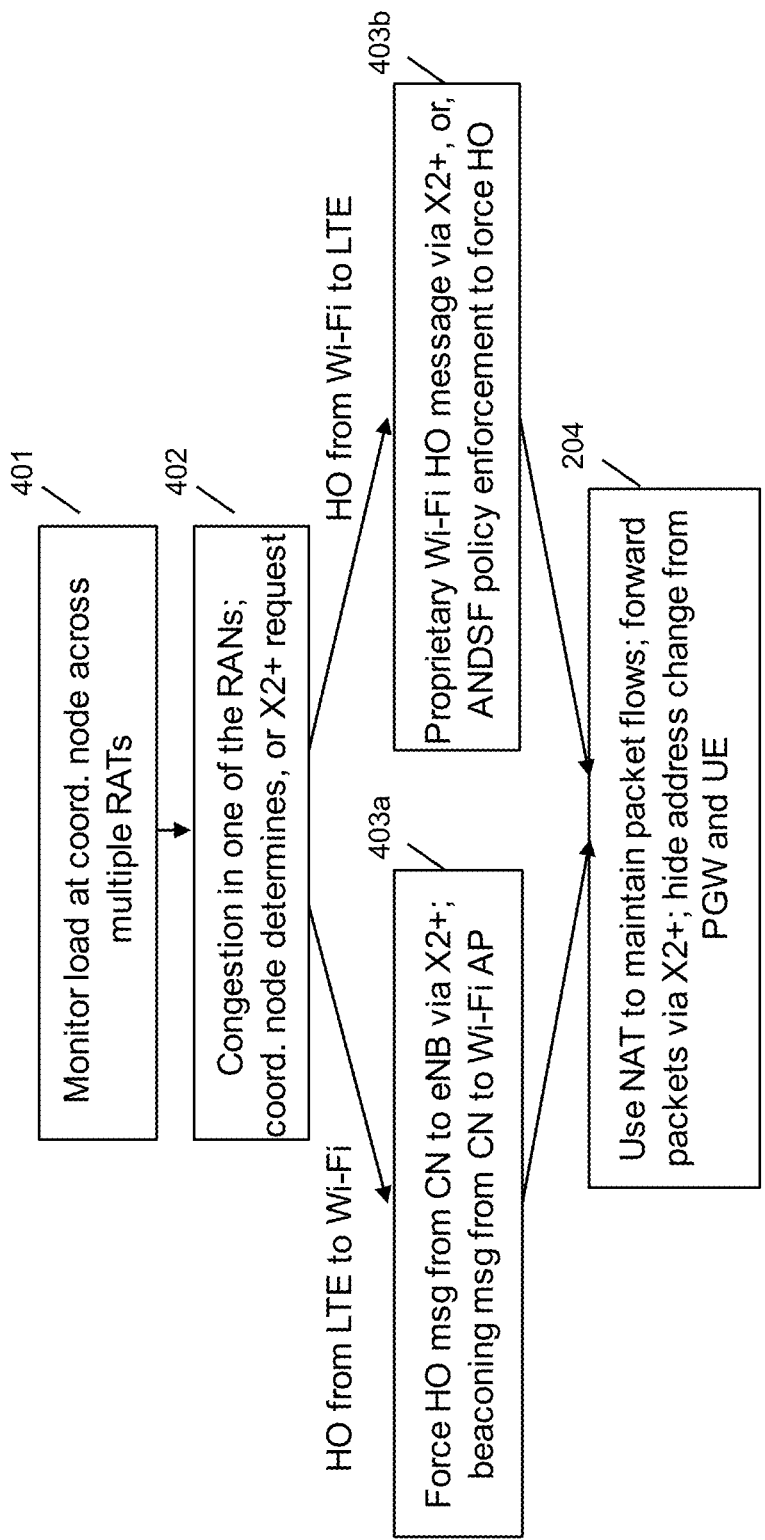
FIG. 4 is a flowchart depicting a handover for traffic steering, in accordance with some embodiments.

FIG. 4 is a flowchart depicting a handover for traffic steering, in accordance with some embodiments. This scenario is very similar to the two scenarios described above, with the exception that the reason for handover may be congestion rather than UE signal strength changes. In some embodiments, at step 401, a coordinating node may monitor both a Wi-Fi AP and an eNodeB, and may detect that the two base stations are unequally loaded. Various different load measurements, such as signal strength, interference, number of users, backhaul utilization, processor utilization, etc. may be used to identify load. Coordinating node is well-suited to manage multiple base stations, as it has a broad view of network conditions throughout the network. At step 402, once the coordinating node detects that an overload condition exists, or once one or the other of the AP/eNB request congestion control via an X2+ message, the coordinating node sends an X2+ message to each node directing them to forcibly hand over a particular UE or UEs.

In the case of LTE-Wi-Fi handover, at step 403a, the coordinating node may direct the eNB via X2+ or S1 that the UE should be handed out, and may direct the AP via X2+ to acquire the UE; the coordinating node may send messages that, for example, cause the AP to broadcast its beacon signal, either at a normal rate or at a higher-than-normal rate to acquire the UE. The UE may then attach to the Wi-Fi network.

In the case of Wi-Fi-LTE handover, at step 403b, the coordinating node may send a message via the X2+ protocol to the AP to cause the UE to be disconnected from the AP. The AP may be configured to handle proprietary messages to drop particular UEs based on identifying information such as Wi-Fi MAC, IMSI, IMEI, or other identifying information. Using the X2+ protocol to cause the AP to disconnect the UE avoids "break before make." Alternatively, the coordinating node may send a new ANDSF policy to the AP, which may contain an ANDSF policy enforcement module. The enforcement module may send an ANDSF policy to the UE to cause the UE to seek another SSID, or to stop using the present SSID, thereby forcing it off of the current AP's network. Alternatively, a congestion message may be sent to the UE to cause it to look for another SSID, and an ANDSF policy may be used to cause the UE to avoid the SSID of the handed-out source AP. In some cases, a "break before make" handover may be used to force the UE off of the Wi-Fi AP.

At step 404, the coordinating node may use NAT to maintain packet flows to the UE on the new RAN, either LTE or Wi-Fi, and may use X2+ from the source to the target via the coordinating node to forward packets from the source AP to the target eNodeB. The UE and PGW may be shielded from any IP address change using NAT. Congestion is thus relieved for the particular node.

X2+ Interface Messages

In one embodiment, wherein the X2+ Interface may be used for communication between a Wi-Fi AP and a coordinating node, the following messages may be defined, each message being further defined below: Connection setup; Connection setup response; Resource status request; Resource status response; Resource status update; Disconnect request; Disconnect response; Action request; and Action response. The messages specified in the X2AP protocol specification are contemplated, with behavior as described below and/or as described in the X2AP specification. Additional messages may also be contemplated, such as messages as described above for implementation of handover, data forwarding, ANDSF, policy management, security, configuration, and other functions. Additionally, future X2AP protocol specification messages may be enabled between the Wi-Fi AP and the coordinating node.

Connection Setup/response: In some embodiments, the AP may send the connection setup message to the coordinating node on the predefined IP/Port. We may use TCP/SCTP transport. The AP or wireless LAN controller (WLC) may send the complete list of basic service set identifiers (BSSIDs), SSID's, neighbor information by channel scan (includes SSID, Channel Number and Bandwidth, received signal strength indicator (RSSI)), or a partial list of same. A connection setup message may be sent by the AP to the coordinating node with all or some of this information. The coordinating node may then return a connection setup response message with configuration information based on the information in the connection setup message.

Resource status request/response: In some embodiments, resource status messages may be sent and received. Resource statuses may be, e.g., the informational parameters described anywhere herein; the resources may be APs, Wi-Fi links themselves, or resources at the AP, such as any of the resources identified in the X2AP specification. The coordinating node may send a resource status request message to AP to request that the AP send a resource status update message. It may also contain the periodicity and the elements that need to be included in the resource status update message.

Resource status update: In some embodiments, resource status messages may be sent by the AP. The AP may send the resource status update periodically/one time (as requested by coordinating node in the Resource status request message).

Resource status update may contain some or all of the following information parameters, which may be sent either on demand or periodically, or both: Neighbor Information by Channel Scan (SSID, Channel Number and Bandwidth, RSSI); Number of Associated Users; Channel Numbers and Bandwidth in Use; Supported Channel Number & Bandwidth; RF Power in Use; Supported RF Power Range; Beacon RF Power Range; Supported Beacon MCS Level; Operation Mode (b/g/a/n/ac) in Use; Supported Operation Mode (b/g/a/n/ac); Carrier Sense Threshold in Use; Supported Carrier Sense Threshold Range; Channel Utilization; Number of Received/Sent Bytes; Number of Received/Sent Packets; Throughput; Traffic (hypertext transfer protocol (HTTP), transport control protocol (TCP)); Quality of STA; BSS Load; WAN metrics, or other information.

Disconnect request/response: Disconnect request/response may be used to disconnect the X2+ connection. The Disconnect procedure can be initiated from either end. A disconnect request may be followed by a disconnect response, acknowledging the disconnect.

Action Request/Response: The action request/response will be used to specify an action to the AP from the coordinating node. The coordinating node may include the recommended action and its value in the request. Following the performance of the action, the AP may return an action response message. The action request can have the following information parameters, which may be sent either on demand or periodically, or both: Commands to APs; Channel Numbers and Bandwidth; Radio Frequency (RF) Power; Beacon modulation and coding scheme (MCS) Level; Operation Mode (b/g/a/n/ac); Carrier Sense Threshold; Maximum Associated stations (STA) for Admission Control; Maximum Packet Retry Count; Request to send (RTS)/Clear to send (CTS) Exchange; Frame Aggregation Level; Data MCS Level (Auto, Fixed); Noise/Interference Immunity Level; and low noise amplifier (LNA) Bypass. Additional information parameters may also be provided.

Once the coordinating node has information about the Wi-Fi AP's/eNodeB's/NodeB's it can intelligently make the decision regarding the load balancing/handovers between the Wi-Fi/LTE/3G. We may be able to cover the following scenarios (as mentioned in the 3GPP TR 37.834, hereby incorporated by reference in its entirety):

UE is within UTRAN/E-UTRAN coverage, is using 3GPP and goes into WLAN AP coverage UE is within UTRAN/E-UTRAN and WLAN coverage, is using WLAN and goes out of WLAN AP coverage UE is within the coverage area of both, UE using WLAN, all or a subset of the UE's traffic should be routed via UTRAN/E-UTRAN instead UE is within the coverage area of both, UE using UTRAN/E-UTRAN, all or a subset of the UE's traffic should be routed via WLAN instead UE using both accesses and should be connected to only one (WLAN or UTRAN/E-UTRAN) or some traffic should be moved to the other access We may use one of the approaches mentioned in 3GPP TR 37.834 for access network selection and traffic steering at UE.

Further Embodiments

Figure 5:
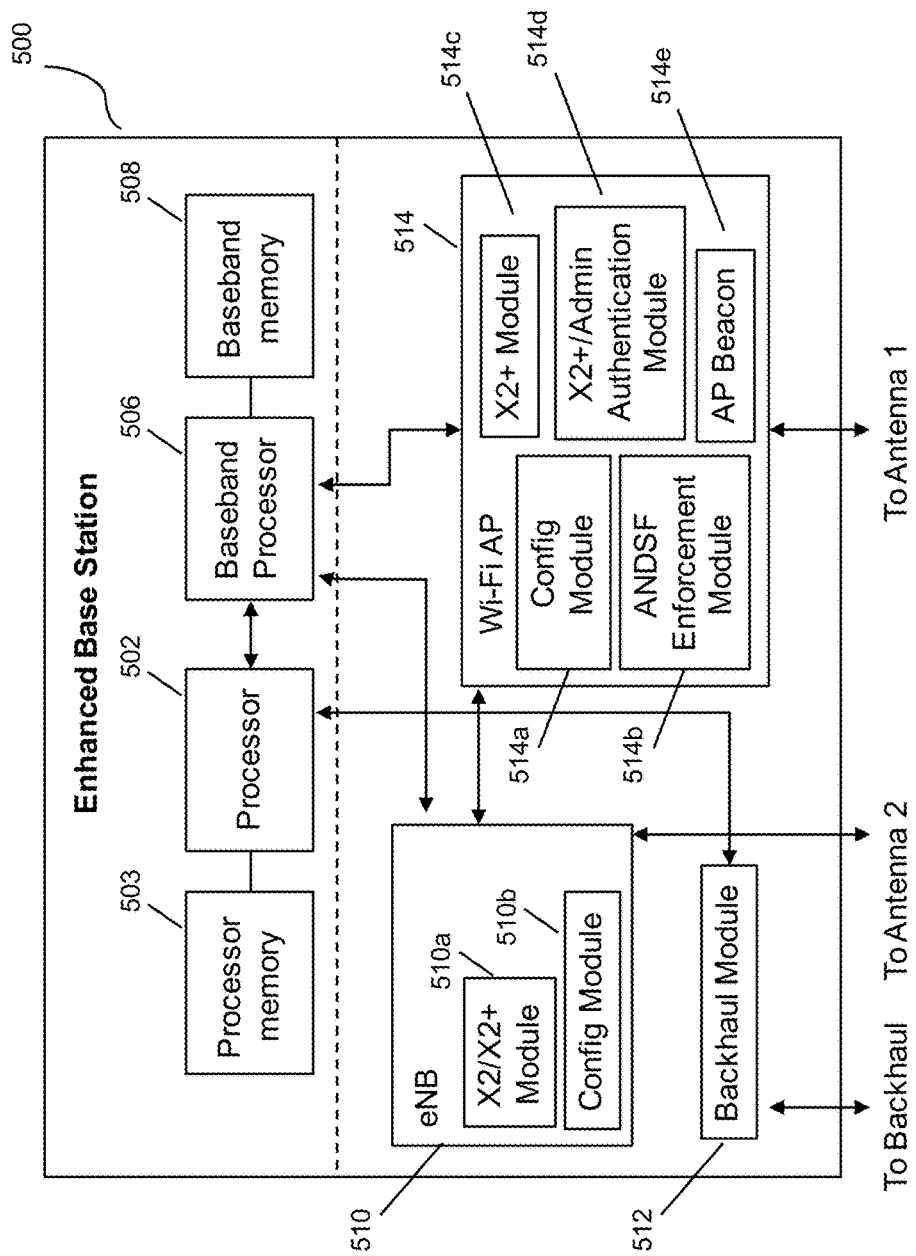
FIG. 5 is a schematic diagram of a multi-radio access technology (multi-RAT) base station, in accordance with some embodiments.

FIG. 5 is a schematic diagram of a multi-radio access technology (multi-RAT) base station, in accordance with some embodiments. Enhanced base station 500 may be an eNodeB for use with LTE, and may also have co-located Wi-Fi AP functionality. In some embodiments the Wi-Fi and eNB portions/functions may be separated into two devices, and may be separately provided in accordance with what is described here with relation to FIG. 5. Enhanced base station 500 may include processor 502, processor memory 504 in communication with the processor, baseband processor 506, and baseband processor memory 508 in communication with the baseband processor.

Enhanced base station 500 may also include an eNodeB functionality 510, which may include X2/X2+ module 510*a* (for communicating with other eNodeBs and with a coordinating node, respectively), and a configuration module 510*b* (enabling remote configuration changes via the X2+ protocol, including for SON applications). Enhanced base station 500 may also include backhaul module 512, providing a backhaul connection to the operator network; this may be a wired or wireless connection and may be another separate LTE UE module. Enhanced base station 500 may also include Wi-Fi AP 514, which may include config module 514*a* (for remote SON configuration and other configuration), ANDSF enforcement module 514*b* (for providing access and admission control enforcement, as described herein, as well as other management functions for the Wi-Fi AP), X2+ module 514*c* (for communicating with the coordinating node), X2+/administrative authentication module 514*d* (for ensuring security with the coordinating node), and AP beacon 514*e* (used to advertise the SSID of the AP).

Processor 502 and baseband processor 506 are in communication with one another. Processor 502 may perform routing functions, and may determine if/when a switch in network configuration is needed. Baseband processor 506 may generate and receive radio signals for both eNodeB 510 and Wi-Fi AP 514, based on instructions from processor 502. In some embodiments, processors 502 and 506 may be on the same physical logic board. In other embodiments, they may be on separate logic boards.

Wireless backhaul or wired backhaul may be used. Wired backhaul may be an Ethernet-based backhaul (including Gigabit Ethernet), or a fiber-optic backhaul connection, or a cable-based backhaul connection, in some embodiments. Wireless backhaul may be provided using an LTE connection, using an LTE UE modem. Additionally, wireless backhaul may be provided, which may be Wi-Fi 802.11a/b/g/n/ac/ad/ah, Bluetooth, ZigBee, microwave (including line-of-sight microwave), or another wireless backhaul connection.

Any of the wired and wireless connections may be used for either access or backhaul, according to identified network conditions and needs, and may be under the control of processor 502 for reconfiguration.

Other elements and/or modules may also be included, such as a home eNodeB, a local gateway (LGW), a self-organizing network (SON) module, or another module. Additional radio amplifiers, radio transceivers and/or wired network connections may also be included. The SON module may be configured to provide transmit power increase/decrease functionality, radio band switching functionality, or communications with another remote SON module providing, for example, these types of functionality, in some embodiments. The SON module may execute on the general purpose processor 502.

Processor 502 may identify the appropriate network configuration, and may perform routing of packets from one network interface to another accordingly. Processor 502 may use memory 504, in particular to store a routing table to be used for routing packets. Baseband processor 506 may perform operations to generate the radio frequency signals for transmission or retransmission by both eNodeB 510 and Wi-Fi AP 514. Baseband processor 506 may also perform operations to decode signals received by eNodeB 510 and Wi-Fi AP 514. Baseband processor 506 may use memory 508 to perform these tasks. Data may be shared between eNodeB 510 and Wi-Fi AP 514, or they may be coordinated by the coordinating node.

Figure 6:
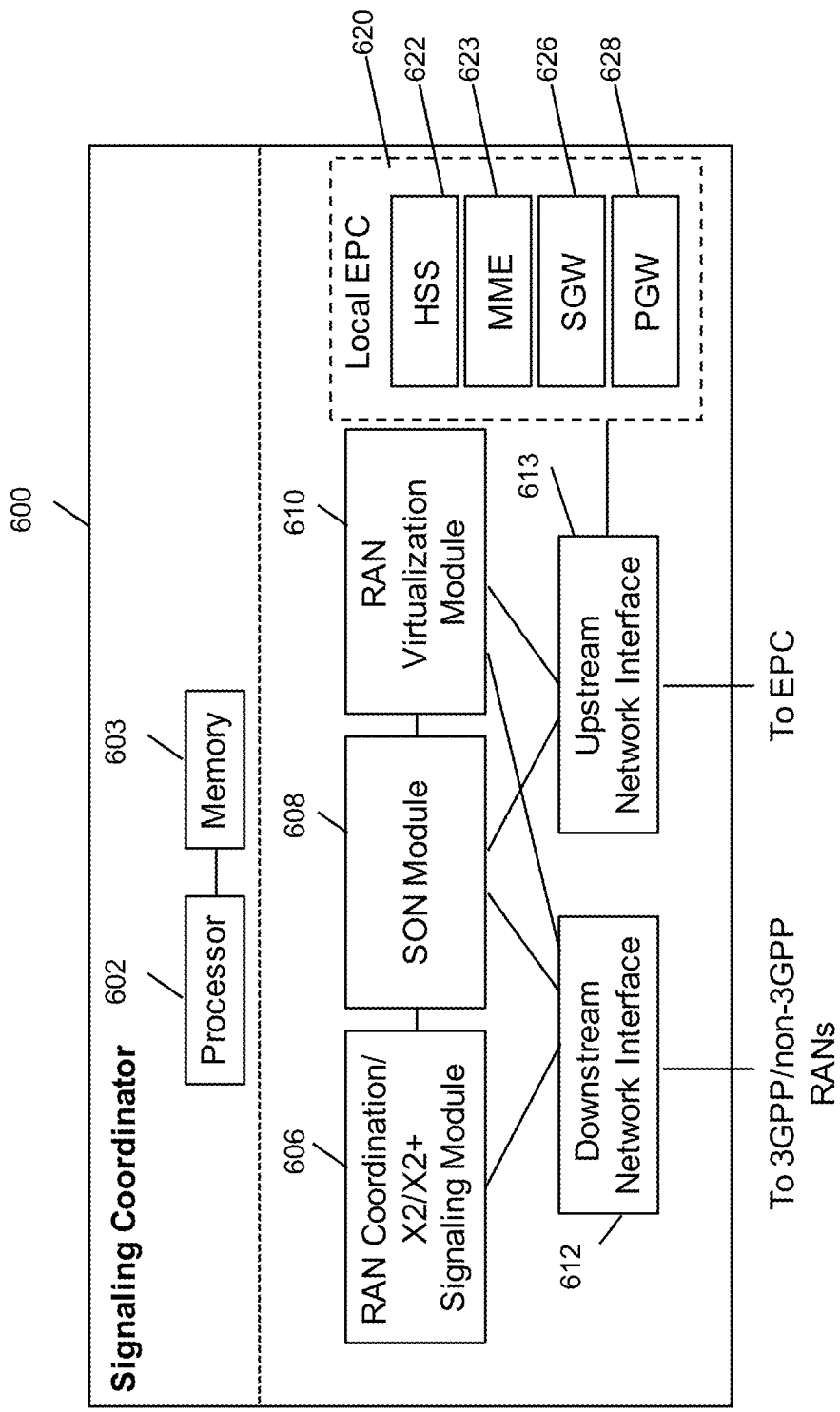
FIG. 6 is a schematic diagram of an enhanced coordination gateway, in accordance with some embodiments.

FIG. 6 is a schematic diagram of an enhanced coordination gateway, in accordance with some embodiments. Signaling coordinator 600 includes processor 602 and memory 604, which are configured to provide the functions described herein. Also present are radio access network coordination/signaling (RAN Coordination and signaling)/X2/X2+ module 606, SON module 608, and RAN virtualization module 610. In some embodiments, coordinator server 600 may coordinate multiple RANs using SON module 608, including 3GPP and non-3GPP RANs. In some embodiments, coordination server may also provide proxying, routing virtualization and RAN virtualization via module 610. In some embodiments, a downstream network interface 612 is provided for interfacing with the RANs, which may be a radio interface (e.g., LTE), and an upstream network interface 614 is provided for interfacing with the core network, which may be either a radio interface (e.g., LTE) or a wired interface (e.g., Ethernet). Signaling storm reduction functions may be performed in module 606.

Signaling coordinator 600 includes local evolved packet core (EPC) module 620, for authenticating users, storing and caching priority profile information, and performing other EPC-dependent functions when no backhaul link is available. Local EPC 620 may include local HSS 622, local MME 624, local SGW 626, and local PGW 628, as well as other modules. Local EPC 620 may incorporate these modules as software modules, processes, or containers. Local EPC 620 may alternatively incorporate these modules as a small number of monolithic software processes. Modules 606, 608, 610 and local EPC 620 may each run on processor 602 or on another processor, or may be located within another device.

Signaling coordinator 600 may be a pass-through gateway for data tunnels, forwarding data through to a core network. Signaling coordinator 600 may also provide encryption functions, e.g., using IPsec for encrypting or decrypting data for forwarding over one or more bearers to the core network. In the case that Wi-Fi is used at one or more base stations to provide access to user devices, the signaling coordinator may be a trusted wireless access gateway (TWAG) or evolved packet data gateway (ePDG), providing the ability for the Wi-Fi user devices to participate in and join the operator network. In some cases, signaling coordinator 600 may be a home eNodeB gateway (HENBGW). Because the built-in QCI and TOS mechanisms used by the methods described herein are passed through by IPsec, GTP-U, and other tunneling protocols, these quality of service (QOS) parameters are preserved by the signaling coordinator 600.

Alternatives

An interworking function between the X2+ protocol and the X2 protocol may be provided, in some embodiments, at the coordinating node, for use such as when the intended recipient of an X2 message is an eNodeB and not an Wi-Fi AP.

In some embodiments a hierarchical ANDSF functionality may be provided. The hierarchical ANDSF may enable certain functions of a typical ANDSF function to be implemented at the AP, such as enforcement functions for Wi-Fi traffic steering and UE admission control, while enabling certain other functionality at a coordinating node, such as global management of policies and global SON utilizing information surfaced by the APs and by eNodeBs in the netowork to enable SON decisions based on global network visibility.

In some embodiments, a SON module at the coordinating node may integrate information from both 3GPP and Wi-Fi base stations, based on the X2+ protocol described herein, which information may include: load on various networks or RANs; historical drops; thresholds for handovers; absolute numbers of call drops; handover statistics; interference and received signal strength of networks, including UE measurement reports; power outages at one or more RANs; configurations and software version numbers.

Coordinating nodes may communicate with each other via the X2+ protocol as peers, and may enable the features described herein across multiple coordinating nodes, for example, handovers or SON coordination across operator network management areas managed by different coordinating nodes. Hierarchical ANDSF may be a single layer hierarchy, or a multiple layer hierarchy with multiple layers of coordinating nodes communicating with each other via the X2+ protocol. Other X2+ functionality described herein may be performed in a hierarchical way with a single level of hierarchy (i.e., parent and child), two levels, or more levels. Individual coordinating nodes may be shared among multiple core networks, or may provide RAN gateway functionality for multiple core networks, or may make multiple operator core networks available to a single RAN (e.g., multi-operator core networks or MOCN).

In some embodiments, the visibility of a coordinating node is in the form of a virtualized RAN or virtualized eNodeB. One or more core networks may see a coordinating node as a single eNodeB. The coordinating node is responsible for performing management on a plurality of eNodeBs and Wi-Fi APs, without additional management from a core network, using the SON features and algorithms described herein, which may include all SON methods described in US20140092765 and US20160135132.

The Hotspot 2.0 standard and/or the 802.11u protocol may be used, in some embodiments. Hotspot 2.0 is a standard published by the Wi-Fi Alliance and defines interoperability and interworking protocols. Network discovery and selection, offload, handoff and security protocols may be handled by the Hotspot 2.0 protocol. In some embodiments, the 802.11u protocol and specification may be used. 802.11u allows Wi-Fi client devices to obtain information from an AP prior to attachment. In some embodiments, ANDSF may be replaced by Hotspot 2.0 or 802.11u. In some embodiments, access network query protocol (ANQP), media independent handover (MIH) information service as defined by 802.21, MIH command and event services capability discovery, emergency alert system (EAS) for handling emergency alerts, and other protocols may be used. Hotspot 2.0 permits advertisement of 3GPP celular network information, including the public land mobile network (PLMN) of any cell co-located at a multi-RAT AP. Hotspot 2.0 and 802.11u information may be provided to the coordinating server, in some embodiments, with the coordinating server acting as a UE if needed, or via a special X2+ protocol request. Protocol enforcement may be performed at the AP, with coordination of AP profiles and settings being performed at the coordinating node, in some embodiments. The X2+ protocol may be used as a protocol for sending, saving, restoring, or otherwise configuring a base station or AP with various configuration payloads, including configuration of ANDSF, Hotspot 2.0, or 802.11u. ANQP query forwarding from the AP to the coordinating node may be supported for UEs that perform generic advertisement service (GAS) or ANQP queries. The 802.11u specification and Hotspot 2.0 protocol specification are hereby incorporated by reference for all purposes.

Where modules are described herein, the intent of this disclosure is to enable the module's functionality to be provided as hardware, software, or partially hardware and partially software, in some embodiments. In the case that a software module is used to implement the functionality of a module, the module may be a single executable, multiple executables, shared libraries, dynamically linked libraries, statically linked libraries, multiple processes with shared memory, multiple processes with inter-process communication (IPC), software running on a single virtual machine or multiple virtual machines, processes communicating with each other over a private or public network over real or virtual network interfaces but colocated at a single machine, or according to any other software design.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, legacy TDD, or other air interfaces used for mobile telephony. In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces. In some embodiments, the base stations described herein may use programmable frequency filters. In some embodiments, the Wi-Fi frequency bands described herein may be channels determined by the respective IEEE 802.11 protocols, which are incorporated herein to the maximum extent permitted by law. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported. The embodiments disclosed herein can be used with a variety of protocols so long as there are contiguous frequency bands/channels. Although the method described assumes a single-in, single-output (SISO) system, the techniques described can also be extended to multiple-in, multiple-out (MIMO) systems.

Those skilled in the art will recognize that multiple hardware and software configurations may be used depending upon the access protocol, backhaul protocol, duplexing scheme, or operating frequency band by adding or replacing daughtercards to the dynamic multi-RAT node. Presently, there are radio cards that can be used for the varying radio parameters. Accordingly, the multi-RAT nodes of the present invention may be designed to contain as many radio cards as desired given the radio parameters of heterogeneous mesh networks within which the multi-RAT node is likely to operate. Those of skill in the art will recognize that, to the extent an off-the shelf radio card is not available to accomplish transmission/reception in a particular radio parameter, a radio card capable of performing, e.g., in white space frequencies, would not be difficult to design.

Those of skill in the art will also recognize that hardware may embody software, software may be stored in hardware as firmware, and various modules and/or functions may be performed or provided either as hardware or software depending on the specific needs of a particular embodiment. Those of skill in the art will recognize that small cells, macro cells, wireless access points, femto gateways, etc. may all benefit from the methods described herein.

In any of the scenarios described herein, where processing may be performed at the cell, the processing may also be performed in coordination with a cloud coordination server. The eNodeB may be in communication with the cloud coordination server via an X2/X2+ protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods may be combined. In the scenarios where multiple embodiments are described, the methods may be combined in sequential order, in various orders as necessary.

Although certain of the above systems and methods are described in reference to the Long Term Evolution (LTE) standard, one of skill in the art would understand that these systems and methods may be adapted for use with other wireless standards or versions thereof.

In some embodiments, the software needed for implementing the methods and procedures described herein may be implemented in a high level procedural or an object-oriented language such as C, C++, C #, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A system providing an enhanced X2 interface in a mobile operator core network, comprising:
   a Long Term Evolution (LTE) core network packet data network gateway (PGW), the LTE PGW being part of the mobile operator core network;
   an evolved NodeB (eNodeB) connected to the LTE PGW;
   a Wi-Fi access point (AP) connected to the LTE PGW via a wireless local area network (WLAN) controller; and
   a coordination node coupled to the Wi-Fi AP via an enhanced X2 interface and providing gateway functionality between the LTE PGW and the eNodeB, and providing gateway functionality between the LTE PGW and the Wi-Fi AP, the coordination node further comprising:
      a radio access network (RAN) virtualization module providing routing network address translation (NAT);
      a protocol module communicating to the eNodeB and the Wi-Fi AP to request inter-radio technology (inter-RAT) handovers of a user equipment (UE) and to forward packets intended for the UE to the UE; and
      an access technology virtualization proxy hiding an underlying radio access technology (RAT) of an access network from the mobile operator core network and presenting interfaces corresponding to the underlying radio access technology to the core network, wherein the coordination node provides a virtualized RAN that reduces interoperability concerns, enables heterogeneity at the RAN layer, and enables inter-RAT handovers without interworking towards the core network.

2. The system of claim 1, wherein the protocol module communicates to the eNodeB and the Wi-Fi AP to request inter-RAT handovers of the UE from the eNodeB to the Wi-Fi AP and to forward packets intended for the UE from the eNodeB to the Wi-Fi AP.

3. The system of claim 1, further comprising an S2/S2a interface module coupled to a Wi-Fi access network gateway, and an S1 interface module coupled to a Long Term Evolution (LTE) access network.

4. The system of claim 1, further comprising, at the coordination node, a trusted wireless access gateway (TWAG) or evolved packet data network gateway (ePDG) to enable a Wi-Fi access network to securely connect to a Long Term Evolution (LTE) core network.

5. A system providing an enhanced X2 interface in a mobile operator core network, comprising:
  a coordination node positioned as a gateway between a Long Term Evolution (LTE) packet gateway (PGW) and an LTE eNodeB, and positioned as a gateway between the LTE PGW and a Wi-Fi AP connected to the LTE PGW via a wireless local area network (WLAN) controller, the coordination node coupled to a Wi-Fi AP via an enhanced X2 interface, the coordination node further comprising:
  a radio access network (RAN) virtualization module providing network address translation (NAT);
  an enhanced X2 protocol module communicating to the eNodeB and the Wi-Fi AP to request inter-radio technology (inter-RAT) handovers of a user equipment (UE) between the eNodeB and the Wi-Fi AP and to forward packets intended for the UE between the eNodeB and the Wi-Fi AP; and
    an access technology virtualization proxy hiding an underlying radio access technology (RAT) of an access network from the mobile operator core network and at the coordination node and presenting interfaces corresponding to the underlying radio access technology to the core network wherein the coordination node provides a virtualized RAN that reduces interoperability concerns, enabling heterogeneity at the RAN layer, and enabling inter-RAT handovers without interworking towards the core network.

6. The system of claim 5, further comprising, at the coordination node, an S2/S2a interface module coupled to a Wi-Fi access network gateway, and an S1 interface module coupled to a Long Term Evolution (LTE) access network and at the coordination node, a trusted wireless access gateway (TWAG) or evolved packet data network gateway (ePDG) to enable a Wi-Fi access network to securely connect to a Long Term Evolution (LTE) core network.

7. The system of claim 5, wherein the coordination node share radio link quality, backhaul link quality, or load across radio access technologies.

8. The system of claim 5, wherein the coordination node provides proxying functionality for a plurality of access networks using a plurality of RATs between a radio access network (RAN) and mobile operator core network.

9. The system of claim 5, wherein the coordination node receives information from a plurality of access networks with multiple access technologies at the coordination node; and provides coordination and self-organizing network (SON) functionality for a plurality of access networks being coordinated by the coordination node.

10. The system of claim 5, wherein the coordination node provides power control among neighbors, traffic admission control, and load balancing for a plurality of access networks being coordinated by the coordination node and wherein the coordination node provides power level adjustment, centralized assignment of power levels, load balancing, traffic steering, and assignment of attachment ordering policies to networks.

11. The system of claim 5, wherein the coordination node manages both 3GPP and Wi-Fi access network nodes.

12. The system of claim 5, wherein the coordination node bi-directional load balancing between WLAN and 3GPP radio access networks.

13. The system of claim 5, wherein the coordination node acts as a mobility anchor for the UE at the coordination node to enable the UE to perform a handover from a 3GPP access network to a Wi-Fi access network and to enable the UE to perform a handover from the Wi-Fi access network to the 3GPP access network.

14. The system of claim 5, wherein the coordination node detects that a handover of the UE is being performed; provides a dynamic host configuration protocol (DHCP) function to a Wi-Fi radio access network; assigns an Internet Protocol (IP) address via DHCP to the UE that preserves a prior IP address of the UE; and performs network address translation (NAT) to deliver packet flows to and from the UE.

15. The system of claim 5, wherein the coordination node an access network discovery and selection function (ANDSF) for the UE.

16. The system of claim 5, wherein the coordination node further uses a co-located access network discovery and selection function (ANDSF) to: inform a Wi-Fi access point (AP) of nearby Long Term Evolution (LTE) eNodeBs, update connection policies at the Wi-Fi AP, and coordinate handovers into and out of the Wi-Fi AP's access network.

17. The system of claim 5, wherein the coordination node further uses, at the coordination node, an S2/S2a interface with a core network to provide Wi-Fi access network connectivity to a core network, and an S1 interface to provide Long Term Evolution (LTE) access network connectivity to the mobile operator core network.

18. The system of claim 5, wherein the coordination node initiates or coordinates inter-RAT handovers.

19. The system of claim 5, wherein the coordination node passes information for an inter-RAT handover from a handover source node to a handover target node, the passed information further comprising information about a mobile device being handed over, packet flows, and open connections or bearers.

20. The system of claim 5, wherein the coordination node controls mobile device admission report on handover statistics, or provide interference mitigation and sharing interference information across access networks.

21. The system of claim 5, wherein the coordination node outage compensation greenfield usage shutdown or traffic steering and admission control based on congestion.

\* \* \* \* \*